Oct. 7, 1941.   H. SINCLAIR   2,258,475
POWER-TRANSMISSION MECHANISM
Original Filed Feb. 10, 1939   2 Sheets-Sheet 1

Inventor
Harald Sinclair
By Dean, Fairbank & Hirsch
Attorneys

Oct. 7, 1941.   H. SINCLAIR   2,258,475
POWER-TRANSMISSION MECHANISM
Original Filed Feb. 10, 1939   2 Sheets-Sheet 2
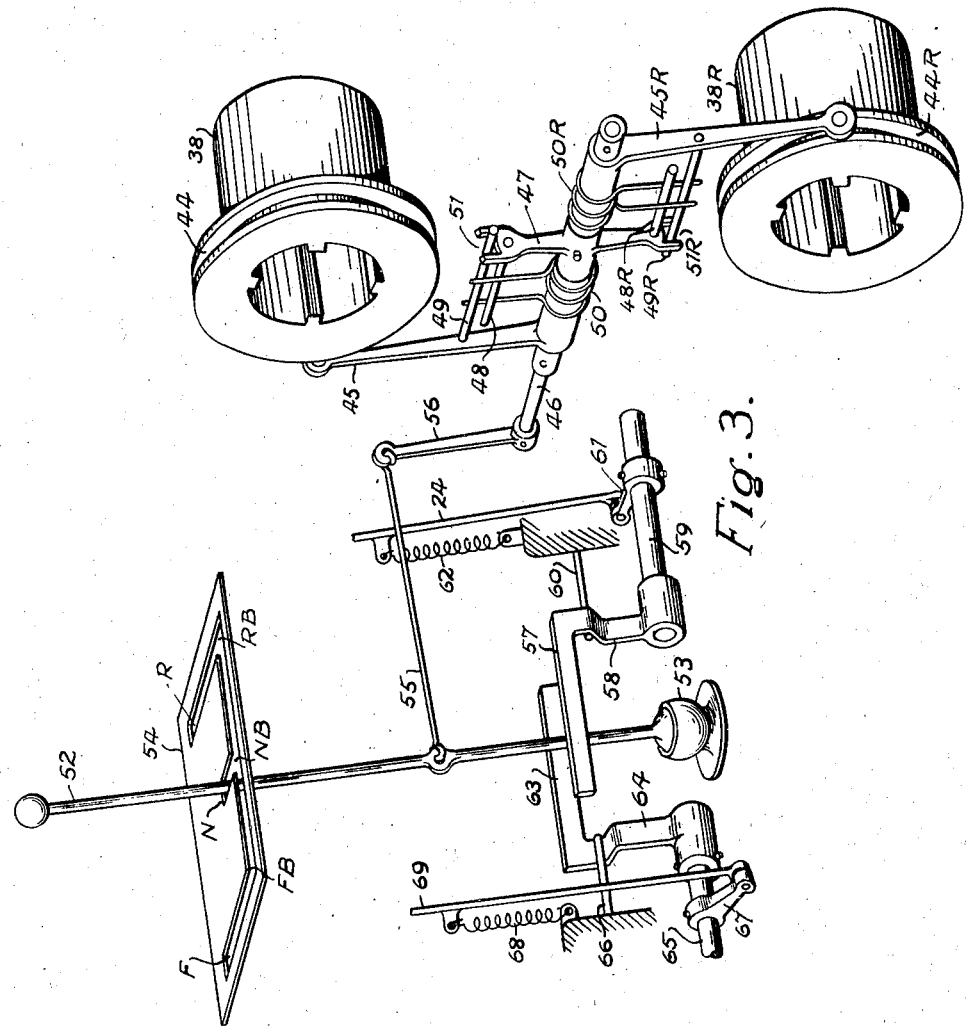

Patented Oct. 7, 1941

2,258,475

UNITED STATES PATENT OFFICE 2,258,475

POWER-TRANSMISSION MECHANISM

Harold Sinclair, Kensington, London, England

Original application February 10, 1939, Serial No. 255,617. Divided and this application August 16, 1940, Serial No. 352,841. In Great Britain February 14, 1938

8 Claims. (Cl. 192—48)

The present application is a division of my Patent application Serial Number 255,617 filed February 10, 1939, on which Patent 2,252,042 was issued on August 12, 1941.

This invention relates to mechanical synchronizing couplings for use in power transmission mechanism.

An object of this invention is to provide an improved form of synchronizing coupling which is capable of being converted from a bi-directionally free condition to a free-wheeling condition.

Another object is to provide such a coupling which is furthermore capable of being locked so as to enable it to transmit torques in both senses.

A further object is to provide synchronizing couplings having improved control means.

Other objects and advantages of the invention will be apparent from the example of an embodiment thereof applied to reversing gearing, which is shown in the accompanying diagrammatic drawings, in which:

Fig. 3 is a perspective view of control mechanism for the power plant of Fig. 1.

Figures 1, 2:
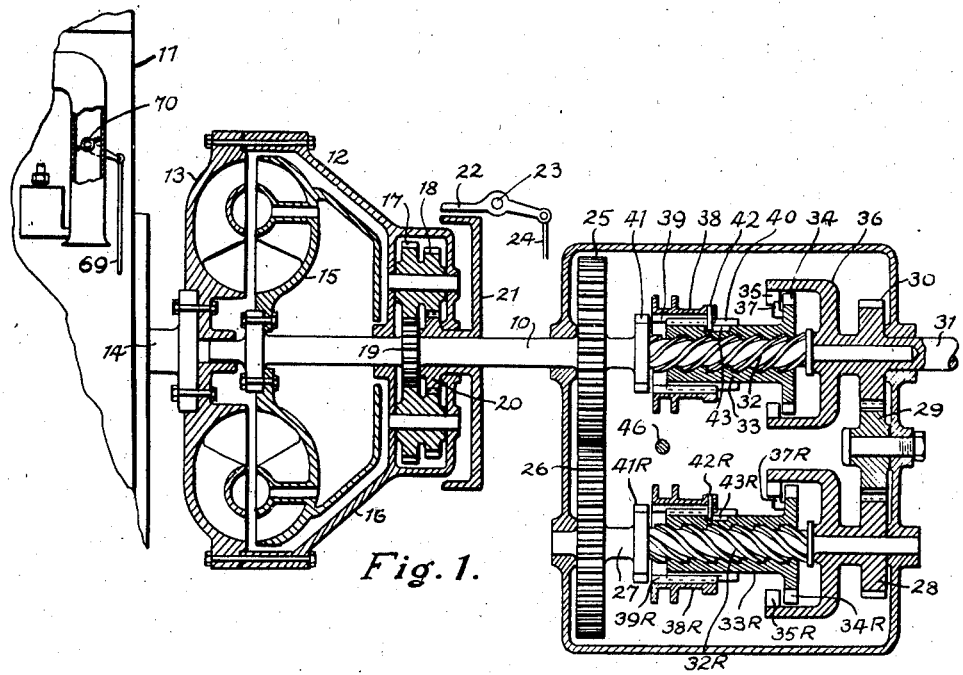
Fig. 1 is a sectional side elevation of part of a marine power plant.
Fig. 2 is a sectional side elevation, to a larger scale, of a part of Fig. 1.

The plant shown in Fig. 1 includes a reversing gear of the countershaft type. The input shaft 10 of the reversing gear is connected to an internal-combustion engine 11 by a hydraulic coupling 12 of the kinetic type associated with controllable planetary gearing adapted temporarily to impart a slow reverse rotation to the shaft 10 by the agency of power applied by the engine. The hydraulic coupling includes an impeller 13 fixed to the engine crankshaft 14, and a runner 15 fixed to the shaft 10. A casing 16 fixed to the impeller carries one or more pairs of planet pinions, such as 17 and 18, one of which is slightly larger than the other. The larger pinion 17 meshes with a sun wheel 19 rigid with the shaft 10, while the smaller pinion 18 meshes with a sun wheel 20 fast on the hub of a brake drum 21 which is journalled on the shaft 10. A brake member 22, pivoted on a fixed pin 23, can be engaged with the drum 21 in consequence of upward movement of a push rod 24. When the drum 21 is held stationary and the engine is running, the planet pinions are rolled by the member 16 round the stationary sun wheel 20 and thereby impart a slow backward rotation to the shaft 10.

The shaft 10 is fixed to a gear wheel 25 meshing with a gear wheel 26 fixed to a countershaft 27. A gear wheel 28 journalled on the countershaft is connected through an idler wheel 29 with a gear wheel 30 fixed to the output shaft 31. The input shaft 10, which normally rotates clockwise as viewed from the left of Fig. 1, is provided with a left-handed helical thread 32 of steep pitch on which is engaged a nut 33 having teeth 34. These teeth are engageable with teeth 35 on a drum 36 fixed to the output shaft 31. The nut 33 carries one or more pawls such as 37, which are biased outwards by springs (not shown) and which face in the trailing direction so that, when the shaft 10 is rotating forwards faster than the shaft 31, these pawls can ratchet over the teeth 35.

A locking sleeve 38, having internal axial splines 39, is engaged with axial splines 40 on the nut 33. The splines are so arranged that, when the teeth 34 and 35 are fully engaged together, the locking sleeve 38 can be slid to the left to bring its splines 39 into engagement with a splined flange 41 fixed on the shaft 10, whereby the nut 33 is locked to the shaft 10. The locking sleeve 38 is coupled to the nut 33 by a lost-motion connection comprising a radial pin 42 fixed to the sleeve 38 and engaging in a longitudinal groove 43 in the surface of the nut 33. The amount of lost motion permitted slightly exceeds the axial dimension of the teeth 35.

A similar coupling is adapted to connect the countershaft 27 to the gear wheel 28, the only difference being that the countershaft coupling has a right-handed helical thread and the pawls point the other way. The parts of the countershaft coupling have the same reference numerals as corresponding parts of the first described coupling, but distinguished by the reference letter R.

The control mechanism will now be described with reference to Fig. 3. The locking sleeves 38 and 38R of the forward and reverse free-wheel couplings are provided respectively with circumferential grooves 44 and 44R, and these grooves are engaged respectively by pins on the ends of two levers 45 and 45R mounted to rock about a transverse shaft 46, the arrangement being such that, when these rocking levers are in their mid positions, both couplings are in the free-wheeling condition, as shown in Fig. 1. An actuating lever 47 is fixed to the shaft 46 and carries a pin 48 which is parallel to the shaft 46 and to a pin 49 fixed to the rocking lever 45. A torsion spring 50 is disposed around the boss of the rocking lever 45 and its ends are disposed respectively on opposite sides of the pins 48 and 49, the arrangement being such that the spring 50 tends to maintain the levers 45 and 47 in the relationship shown, in which the pins 48 and 49 are adjacent to each other. The lever 47 is provided with a recess 51 accommodating the free end of the pin 49 with a limited degree of lost motion about the axis of the shaft 46. An identical arrangement of resilient connection in parallel with a positive lost-motion connection couples the actuating lever 47 to the rocking lever 45R, corresponding parts being distinguished by the letter R added to the same reference numerals.

The system is controlled by a handle 52 universally mounted at 53 and working in an E-shaped gate 54. The handle 52 is connected to the shaft 46 by a link 55 and a crank 56. When the handle 52 is in the short limb N of the gate as shown, or level with this limb, the rocking levers 45 and 45R are normally in their mid positions so that the locking sleeves 38 and 38R are in the positions shown in Fig. 1 and both synchronizing couplings are in condition to operate as free wheels.

A bar 57 is mounted on a crank 58 fixed to a shaft 59 journaled by means not shown. A lever 61 fixed to the shaft 59 is pivoted to the push rod 24 that actuates the brake of the planetary gearing and a tension spring 62 normally maintains this brake disengaged and holds the crank 58 against a fixed stop 60.

A bar 63 is mounted on a crank 64 and disposed on the side of the handle 52 opposite to the bar 57. The bar 63 is mounted on a crank 64 fixed to a shaft 65 journalled by means not shown. A lever 67 fixed to the shaft 65 is pivoted to a push rod 69 which when raised opens the throttle valve 70 of the engine (Fig. 1). A tension spring 68 normally holds the crank 64 against a fixed stop 66 and thus maintains the throttle valve in the idling position.

This mechanism operates as follows. It will be assumed that the handle 52 is in the position shown, which represents neutral. The engine 11 is started, the input shaft 10 rotates forward and both free-wheel couplings over-run, the pawls 37 and 37R ratcheting over the teeth 35 and 35R respectively. The handle 52 is now pulled to the point NB, so that it rocks the bar 57, causing the input shaft 10 to be arrested and temporarily urged backwards by the planetary gearing, the slip in the hydraulic coupling 12 permitting the engine to continue idling. Both free-wheel couplings thereupon engage, the nuts 33 and 33R moving to the left against the flanges 41 and 41R and bringing the teeth 34 and 34R cleanly into mesh respectively with the teeth 35 and 35R under the guidance of the pawls 37 and 37R. The gear is thus locked solid, the shaft 10 being at rest and the brake drum 21 slipping under the brake 22. In this condition the pins 42 and 42R are at the right-hand ends of the grooves 43 and 43R.

The handle 52 is now moved say to position FB. The control shaft 46 is consequently rocked anti-clockwise so that the locking sleeve 38 of the forward-drive synchronizing coupling is moved to the left, through the agency of the spring 50, until its splines 39 engage with the splined flange 41, and thus this coupling is rendered bi-directionally locked. At the same time the spring 50R urges the reverse-drive coupling locking sleeve 38R to the right; but, since the pin 42R is already at the right-hand end of the groove 43R, the sleeve 38R does not move immediately, the lost motion provided by the recess 51R in the actuating lever 47 permitting the necessary relative angular displacement of the shaft 46 and the lever 45R. The handle 52 is now moved to position F, with the result that the brake 22 is disengaged by the spring 62 and the engine throttle valve 70 is opened by the displacement of the bar 63. The output shaft 31 is now driven forwards through the locked forward-drive synchronizing coupling, and the reverse-drive synchronizing coupling disengages, the nut 33R running out to its extreme right-hand position where the pawls 37R are out of register with the teeth 35R, and the locking sleeve 38R moving to the right from the position shown in Fig. 1 under the influence of the spring 50R.

To reverse the rotation of the output shaft 31, the handle 52 is moved through position FB and urged towards position RB. The movement to position FB shuts the engine throttle 70 and applies the back-turning brake 22 so that the shafts 10 and 31 are arrested. The movement towards position RB rocks the control shaft 46 clockwise, so that the locking sleeve 38 is displaced through the agency of the spring 50 to the position shown in Fig. 1. Since the inertia of the vessel causes the forward drive coupling to remain engaged under over-running torque, the pin 42 abuts against the right-hand end of the slot 43 and prevents further displacement of the locking sleeve 38 to the right. Meanwhile the locking sleeve 38R has been displaced through the agency of the spring 50R to the position shown in Fig. 1, so that the reverse-drive coupling is in free-wheeling condition. Since the splines 39R are not in register with the splines of the flange 41R, further displacement of the locking sleeve 38R to the left is prevented.

When the input shaft 10, and with it the output shaft 31 attempt to turn in the reverse direction under the influence of the planetary gear, the reverse-drive coupling also engages, the nut 33R moving to its extreme left-hand position and the teeth 34R meshing cleanly with the teeth 35R under the guidance of the pawls 37R. The spring 50R thereupon moves the locking sleeve 38R into engagement with the splined collar 41R, so that the reverse-drive coupling is bi-directionally locked. The pin 49R co-operates with the recess 51R to prevent the handle 52 from reaching the point RB on the gate before the reverse-drive coupling has become bi-directionally locked. The handle 52 is now moved round the corner RB of the gate to the point R, so that the brake 22 is released and the engine throttle is opened. The input shaft 10 now rotates forwards, driving the output shaft backwards through the reverse-drive coupling, and the nut 33 of the forward-drive coupling runs out to its extreme right-hand position where the pawls 37 are out of register with the teeth 35, the locking sleeve 38 moving to the right from the position shown in Fig. 1 under the influence of the spring 50.

The change from reverse to forward gear is effected similarly.

While the example of the improved synchronizing coupling herein described is embodied in reversing gearing, it is to be understood that the improved coupling, as defined in the following claims, is also applicable to other kinds of power transmission mechanism.

I claim:

1. A synchronizing coupling comprising a first member having a set of jaw-clutch teeth, a second member rotatable relatively to said first member, an intermediate member having a set of jaw-clutch teeth and drivably connected to said second member by cooperation helically disposed torque-transmitting surfaces, said intermediate member being longitudinally movable relatively to said first and second members so as to interengage and disengage said sets of clutch teeth, a subsidiary ratchet drive capable of coupling said first and intermediate members and effecting engagement of said sets of clutch teeth without clashing on relative displacement of said cooperating helical surfaces in one sense, and control means operable for relatively displacing said first member and said intermediate member, at least in part axially, from a disengaged position, in which said subsidiary ratchet drive is inoperative and the coupling is bi-directionally free, to an engaged position, in which said subsidiary ratchet drive is operative and the coupling is in free-wheeling condition.

2. A synchronizing coupling comprising a first member having a set of jaw-clutch teeth, a second member rotatable relatively to said first member, an intermediate member having a set of jaw-clutch teeth and drivably connected to said second member by cooperating helically disposed torque-transmitting surfaces, said intermediate member being longitudinally movable relatively to said first and second members so as to interengage and disengage said sets of clutch teeth, a pawl on one of said toothed members engageable with teeth on the other of said toothed members and so positioned as to effect interengagement of said sets of clutch teeth without clashing on relative displacement of said cooperating helical surfaces in one sense, and control means operable for relatively displacing said first member and said intermediate member, at least in part axially, from a disengaged position, in which said pawl is out of the path of the teeth with which it cooperates and the coupling is bi-directionally free, to an engaged position, in which said pawl is in the path of the teeth with which it cooperates and the coupling is in free-wheeling condition.

3. A synchronizing coupling comprising a first member having a set of jaw-clutch teeth, a second member rotatable relatively to said first member, an intermediate member having a set of jaw-clutch teeth and drivably connected to said second member by cooperating helically disposed torque-transmitting surfaces, said intermediate member being longitudinally movable relatively to said first and second members so as to interengage and disengage said sets of clutch teeth, a pawl on one of said toothed members engageable with teeth on the other of said toothed members and so positioned as to effect interengagement of said sets of clutch teeth without clashing on relative displacement of said cooperating helical surfaces in one sense, and control means operable for displacing said intermediate member relatively to said first and second members from a disengaged position, in which said pawl is out of the path of the teeth with which it cooperates to a free-wheeling position in which said pawl is in the path of said last-mentioned teeth, said control means permitting automatic displacement of said intermediate member from said free-wheeling position to a driving position in which it is in mesh with the teeth of said first member.

4. A synchronizing coupling comprising a toothed first member, a second member co-axial with and rotatable relatively to said first member, an intermediate member so mounted on said second member as to be caused to move helically thereon in consequence of relative rotation between said intermediate and second members, said intermediate member having teeth engageable with the teeth of said first member, a pawl on one of said toothed members engageable with teeth on the other of said toothed members and so positioned as to permit engagement of said toothed members without clashing on relative angular displacement of said first and second members in one sense, a locking member constrained to rotate with and slidable relatively to said intermediate member, and coupled thereto by a connection limiting the relative axial displacement of said locking and intermediate members, means constrained to rotate with said second member and capable of being clutched to said locking member to prevent relative rotation of said second member and said locking member and control means operable for displacing said locking member axially relatively to said first and second members.

5. A synchronizing coupling comprising a toothed first member, a second member co-axial with and rotatable relatively to said first member, an intermediate member so mounted on said second member as to be caused to move helically thereon in consequence of relative rotation between said intermediate and second members, said intermediate member having teeth engageable with the teeth of said first member, a pawl on one of said toothed members engageable with teeth on the other of said toothed members and so positioned as to effect engagement of said toothed members without clashing on relative angular displacement of said first and second members in one sense, a locking member constrained to rotate with said intermediate member and coupled thereto by a connection limiting the relative axial displacement of said locking and intermediate members in one sense, said locking member having splines so positioned as to be engageable with splines on said second member only when the teeth of said first and intermediate members are meshed together, and control means operable for displacing said locking member axially relatively to said first and second members.

6. A synchronizing coupling comprising a toothed first member, a second member co-axial with and rotatable relatively to said first member, an intermediate member so mounted on said second member as to be caused to move helically thereon in consequence of relative rotation between said intermediate and second members, said intermediate member having teeth engageable with the teeth of said first member, a pawl on one of said toothed members engageable with teeth on the other of said toothed members and so positioned as to effect engagement of said toothed members without clashing on relative angular displacement of said first and second members in one sense, a locking member constrained to rotate with said intermediate member and coupled thereto by a lost-motion connection permitting limited relative axial displacement, said locking member having splines engageable with splines on said second member only when the teeth of said first and intermediate members are meshed together, and an actuating member coupled to said locking member by a resilient connection arranged in parallel with a positive lost-motion connection.

7. A synchronizing coupling comprising a first member having teeth, a second member rotatable relatively to said first member, an intermediate member co-axial with and axially movable along said second member, said second and intermediate members having co-operating helically disposed torque-transmitting surfaces, and said intermediate member having teeth engageable with said teeth of the first member, a pawl on one of said first and intermediate members engageable with teeth on the other of said last-mentioned two members and so positioned as to effect engagement of said teeth together without clashing in response to torque acting in one sense between said helically disposed surfaces, external splines on said intermediate member, a locking sleeve having internal splines co-operating with said external splines, external splines on said second member positioned to mesh with said internal splines only when said teeth are fully engaged together, a control member for axially displacing said locking sleeve, and means on said locking sleeve co-operating with means on said intermediate member for causing said intermediate member to be moved axially by said locking sleeve, when the coupling is bi-directionally free, in such a direction as to bring said pawl into the path of the teeth with which it co-operates while permitting said intermediate member to move in the same direction in advance of said locking sleeve.

8. A synchronizing coupling comprising a first member, a second member rotatable relatively to said first member, and unidirectional coupling means capable of coupling said first and second members together including an intermediate member drivably connected to said second member and having jaw-clutch teeth engageable with jaw-clutch teeth on said first member, locking means operable only in consequence of engagement of said unidirectional coupling means under torque in one direction for converting said unidirectional coupling means into condition to transmit torques in both directions between said members, and control means operable in one direction to lock said locking means and in the other direction to permit said unidirectional coupling means to become bi-directionally free.

HAROLD SINCLAIR.